United States Patent
Fredregill et al.

[19]

[11] Patent Number: 6,138,911
[45] Date of Patent: *Oct. 31, 2000

[54] IN-STORE POINTS REDEMPTION SYSTEM AND METHOD

[75] Inventors: Willard R. Fredregill, Lakeville; Harold E. Schrum, Chanhassen, both of Minn.

[73] Assignee: Carlson Companies, Inc., Minneapolis, Minn.

[ * ] Notice: This patent is subject to a terminal disclaimer.

[21] Appl. No.: 09/300,151

[22] Filed: Apr. 27, 1999

Related U.S. Application Data

[63] Continuation of application No. 08/759,170, Dec. 3, 1996, Pat. No. 5,923,016.

[51] Int. Cl.⁷ ................................................. G06F 17/60
[52] U.S. Cl. ............................. 235/383; 235/380; 902/22; 705/14
[58] Field of Search .................................. 235/380, 383; 902/22; 705/14, 16, 17, 18, 20

[56] References Cited

U.S. PATENT DOCUMENTS

| | | | |
|---|---|---|---|
| 5,202,826 | 4/1993 | McCarthy | 395/214 |
| 5,310,997 | 5/1994 | Roach et al. | 235/375 |
| 5,574,269 | 11/1996 | Mori et al. | 235/380 |
| 5,923,016 | 7/1999 | Fredregill et al. | 235/380 |

FOREIGN PATENT DOCUMENTS

96/31848  10/1998  WIPO .

OTHER PUBLICATIONS

"Debit Card News Debit Issuer Flies Right With Reward Plan," Bank Network News, Jan. 27, 1995.

*Primary Examiner*—Karl D. Frech
*Assistant Examiner*—Drew A. Dunn
*Attorney, Agent, or Firm*—Merchant & Gould P.C.

[57] ABSTRACT

A computer implemented consumer transaction point accumulation system in which a consumer earns and accumulates points immediately for immediate use during transactions at participating retailer outlets, wherein at each transaction, a customers identification number is transmitted to a host data base which stores customer records including a customer balances of points accumulated to date. The system processing each consumer transaction during the consumer visit to the retailer outlet to determine points awarded for each transaction and to determine whether the item purchased is a redeemable item for which points may be redeemed for a reduction of the price of the redeemable item. The system updating said customer records immediately by adding points awarded or subtracting points redeemed from the customer balance of transaction points.

12 Claims, 4 Drawing Sheets

IN-STORE POINTS REDEMPTION SYSTEM AND METHOD

This application is a Continuation of application Ser. No. 08/759,170, filed Dec. 3, 1996, now U.S. Pat. No. 5,923,016 which application is incorporated herein by reference.

FIELD OF THE INVENTION

This invention relates generally to a system utilized in conjunction with point-of-sale computer systems of the type used in retail stores to perform sales transactions, including electronic authorization payment. More specifically, the invention provides a method and apparatus for enhancing a retailer's point-of-sale system with the ability to assist building customer loyalty to the retailer and manufacturers. Loyalty is built through providing each customer with points for transactions at specified retailer locations that can be redeemed to receive reductions on or to purchase selected items.

BACKGROUND

Traditionally, in a retail environment, retailers and manufacturers build customer loyalty to goods and services offered for sale through advertising and coupons. Many manufacturers distribute coupons for their products, either through the mail, by printing them in newspapers or magazines, or enclosing them in similar or related product packages. Presently, there are point-of-sale systems which assist manufacturers with coupon distribution by printing redeemable coupons at the point-of-sale terminal for immediate delivery to the customer. These systems are designed specifically for putting discount coupons for selected products in the hands of a customer who uses some other competing product. One problem with such a system is that it does not eliminate the problem that an individual must have coupons on their person when visiting a retail outlet in order to receive the benefit intended. For this reason, individuals who are not avid coupon collectors will not see value in such a system because such a system still requires the individual to consciously shop with coupons in mind in order to receive a benefit. It will not make a difference to an average customer who does not normally use coupons whether coupons are obtained at the point-of-sale device after a transaction or are collected from mass mailings or the newspaper.

Generally, coupons encourage purchase of a product and may build loyalty to manufacturers. However, no loyalty is built to retailers through the use of coupons. There is a need for a system that can also build customer loyalty for retailers. There is also a need for a system that can build customer loyalty of the average customer who is not an avid coupon collector or does not have coupons on their person at the time of making purchases. Such a system would need to provide other incentives in association with items being purchased as well as other types of products and services.

Although there are also existing point-of-sale systems which assist retailers with customer loyalty in a non-coupon environment, problems exist with such systems. One such system implements a magnetic card and card reader into the point-of-sale system. In this system retailers provide their customer's with magnetic stripe account cards that are to be presented at the point-of-sale for receiving a retailer-determined discount on goods and services the retailer sells. In this system, upon making a purchase, customers will obtain a discount by receiving a cash value equal to a portion of the amount of the purchase. The cash value is not given directly to the customer but is added to an existing cash value stored in the customer's account which can only be accessed at established intervals. The problem with such a system is that it is very restrictive in that it does not allow the customer to have immediate access to the discount. Moreover, a customer may not know his/her cash value account balance after several purchases have been made at different participating retailers (e.g., because the system does not provide immediate updates of the customer's account value at the point of sale). Accordingly, there is a need for a system which allows a customer to obtain incentives and be informed of and immediately use these incentives during the same transaction in which they are earned. The system must allow a customer to be informed at the point-of-sale device immediately following each transaction of his or her incentives earned and used in that transaction. The system must also then inform the customer of his or her new unused incentives accumulated, even if there are multiple transactions at multiple retailer outlets in the same day.

SUMMARY

The present invention provides a computer implemented consumer transaction point accumulation system in which a consumer earns points immediately for transactions at participating retailer outlets. The points earned may be used to immediately reduce the price of select items purchased by a consumer. One system which implements principles of the present invention is comprised of an in-store system having a local processor, local data storage electrically coupled to the local processor, data input means electrically coupled to the local processor for receiving a consumer account number, and a local communicator electrically coupled to the local processor for transmitting requests for consumer account data. The system further includes a host system having a host processor, a host database electrically coupled to the host processor and a host communicator electrically coupled to the host processor for receiving requests for the consumer account data from the local processor through the local communicator. The host database includes a plurality of consumer records and merchant records, wherein each consumer record includes the consumer account data for each participating consumer.

The host communicator transmits the consumer account data to the in-store system local processor which directs the consumer account data transmitted to an in-store system display and to the local data storage to be stored. The local processor processes each consumer transaction during the consumer's visit to the retailer outlet to determine whether points are to be awarded. The local processor immediately updates the total number of transaction points stored in the local data storage by adding any points awarded to the customer during their visit to the retailer outlet. The local processor queries the data representing the updated total number of transaction points following data entry of redeemable items into the system to determine whether the total number of points earned by the consumer is high enough to allow for an immediate price reduction on a redeemable item. The system allows for an immediate reduction of the purchase price of redeemable items purchased and an immediate reduction in the number of points in the consumer's account balance.

BRIEF DESCRIPTION OF THE DRAWING

The invention may be more completely understood in consideration of the following detailed description of the invention in connection with the accompanying drawing, which are incorporated in and constitutes a part of this specification, in which.

DETAILED DESCRIPTION

System Overview

Figure 1:
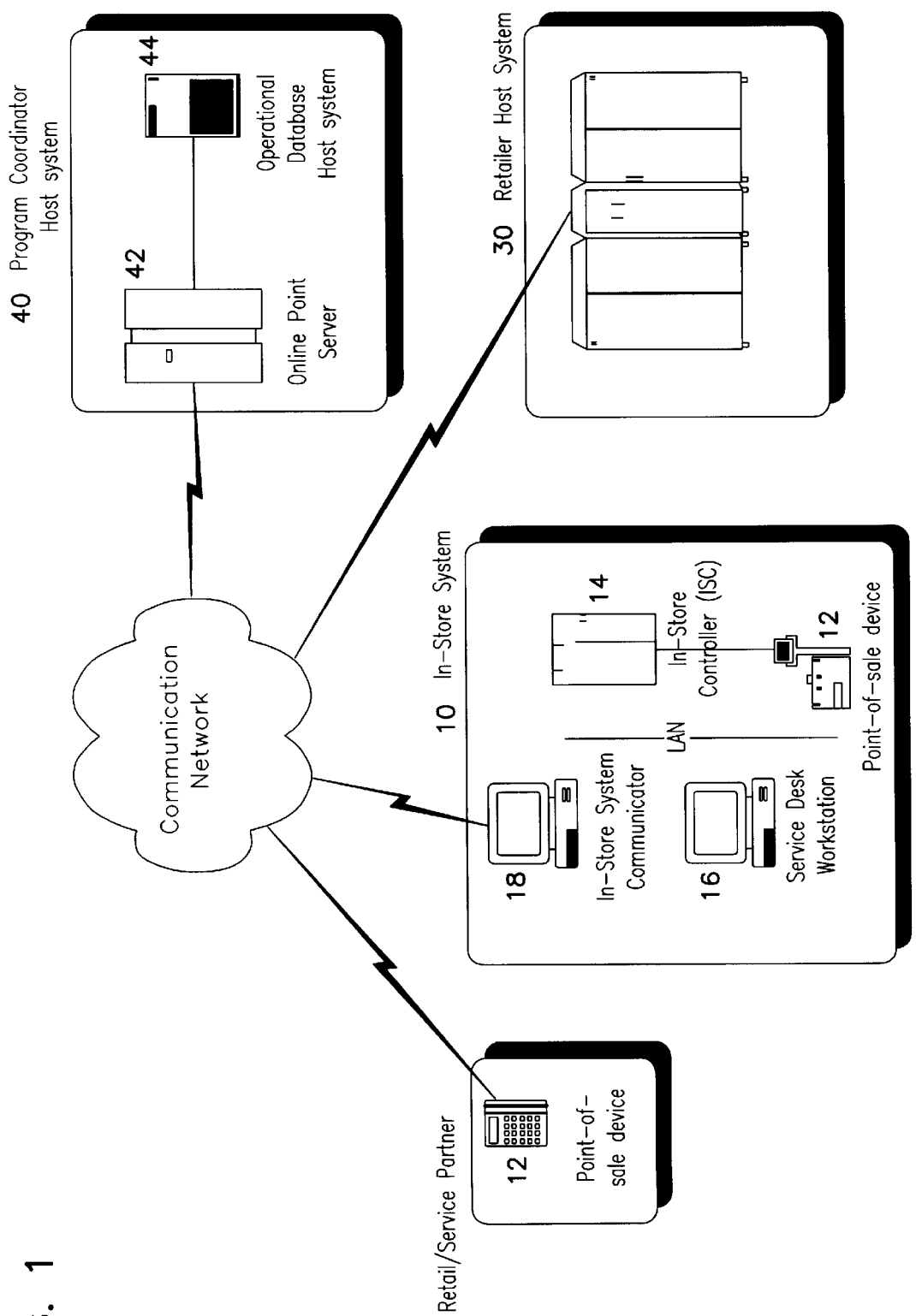
FIG. 1 is a functional diagram illustrating the various functional blocks of an in-store points redemption system in accordance with the invention.

The principles of the present invention provide for a computer implemented on-line electronic consumer transaction point accumulation system in which a consumer earns points which are immediately reflected in a central location regardless of where the points are earned. Use of the invention provides a plurality of different retailers with the ability to develop consumer loyalty (e.g., a "loyalty program"). Supported by a network of non-competing retail partners, use of the invention allows retailers to increase revenues and profitability by assisting in the retention of loyal shoppers and acquiring new customers.

The loyalty program implemented by a preferred embodiment system constructed according to the principles of the present invention, takes place in retail outlets. It is to be understood that retail outlets is meant to include any establishment from which a consumer may purchase goods or services, including stores, service establishments, catalog outlets and mail order houses. The system functionality in each retail outlet is implemented by the in-store system controller, the point-of-sale device such as a cash register, or through a service desk work station. The service desk is where a customer may enroll in the program, redeem points for certificates, transfer points from one account to another, or have certain administrative functions performed.

No enrollment period is required to participate in the loyalty program. Although a customer may complete an optional enrollment form which is available at the retailer location. A permanent point accumulation card is issued to the customer to open the customer a personal point accumulation program account. Accounts are immediately opened automatically by the host when the card is used for the first time in a point update transaction. The point accumulation card may be a card having a read only magnetic stripe or bar-code positioned on the card. The bar-code or magnetic stripe includes data representing the customers account number which when input into the system prompts the system to search for the customer's point accumulation account. The card number, which is preferably sixteen digits, includes a persistent six digit ISO (International Standards Organization) number and a check digit.

Generally, the program implemented with the system works as follows. Each time a customer shops at a retailer outlet, during check-out or payment for items purchased, the customer's point accumulation card is swiped or scanned through a point-of-sale device magnetic card reader or bar-code scanner that is part of the system. The system reads the customer account number which is encoded on the magnetic stripe or bar-code and sends a request for retrieval of the customer point balance which is linked to the customer account number. The system also includes the ability to handle late card presentation and an alternateidentification, such as a credit card or driver license number. If alternate identification is presented by the customer for a program transaction in the form of a credit card instead of the program customer account card, the system will include a mechanism to identify the customer and the customer account number from the credit card information processed by the system so that a request for retrieval of the customer coin balance can be sent. One mechanism that can be used to identify the customer is to link the alternate identification (such as credit card information) to the customer primary account number, so that when the host system processes the alternate identification sent by the point-of-sale device, the host system can locate the customer account by way of the link between the account number and alternate identification, and return the primary account number to the point-of-sale (POS) device.

Following the request for retrieval of the customer point balance, the system retrieves at least the customer's current accumulated point balance from a centralized host system data base. The data retrieved, which includes at least the customer's accumulated point balance is stored at the point-of-sale device in temporary storage and is transmitted real-time to the point-of-sale device. Customers may earn points based on the pre-tax non-exempt purchase total at retailer outlets. The points that may be earned include "regular" points and "bonus" points. Any points earned, regular or bonus, are added to the customer's current point balance stored in centralized host system data base real-time.

A customer may earn "regular" points based on the pretax dollar amount of the current sales transaction, less any exempt items. "Bonus" points are extra points that may be earned by the customer on the purchase of specially promoted items throughout the retailer outlet. Bonus points typically have a pre-set value defined on the item stored in the item master file within the POS controller. For example, if a specific brand of a box of washing powder has seventy five bonus points attached to it in the master file, a customer will be awarded seventy five points upon purchase of the item. Bonus points may also be awarded in a variable pricing scheme. One example of a variable points award pricing scheme is in the context of items that have variable prices based on the amount purchased or weight, such as fruits, vegetables and meats which may award 50 points for each pound of an item purchased. "Bonus" points may be sponsored by the retailer, manufacturer or the program coordinator. The amount of "regular" points that may be earned on a sales transaction is dependent on the dollar amount of the transaction, whereby the calculation of "regular" points is skewed on a sliding scale to favor customer's making purchases that total a larger dollar amount. An example of the manner in which regular points are awarded is shown below in Table 1. Not all consumer products are eligible for point accumulation. For example, exempt items such as tobacco and alcohol do not generate points when purchased.

As shown in Table 1 below, in one embodiment, the system is configured so that it has two "breakpoints" for point calculations. A breakpoint is the minimum purchase amount required to begin earning points. The first breakpoint in this embodiment is ten dollars ($10). The second breakpoint, in this embodiment is twenty five dollars ($25). Twenty five dollars ($25) Is an amount just above the current average transaction amount which triggers a higher point issuance rate. All cent amounts are truncated when calculating points. Although transactions less than the ten dollar ($10.00) minimum are not eligible for regular points, bonus points are awarded for any bonus items purchased even if the transaction amount is less than ten dollars ($10.00). At any given time, the average store may feature several hundred bonus items. It will be appreciated by those skilled in the art that the number of points, the various break points and the bonus items are representative of one preferred embodiment by a system implementing the principles of the present invention. Other point amounts, dollar amounts and products might be used and should not be construed as limitations of the present invention.

TABLE 1

Example
Points are calculated based on the following criteria:

| Minimum purchase | $10 |
| First break point | 5 points per dollar ≧ $10 |
| Second break point | 10 points per dollar ≧ $25 |

| Purchase Amount | First Break Points Awarded | Second Break Points Awarded | Total Regular Points Awarded |
| --- | --- | --- | --- |
| $5.00 | 0 | 0 | 0 |
| $10.00 | 5 points | 0 | 5 points |
| $15.21 | 6 × 5 points | 0 | 30 points |
| $25.00 | 15 × 5 points | 1 × 10 | 85 points |
| $30.99 | 15 × 5 points | 6 × 10 points | 135 points |

The example shown above in Table 1 illustrates the manner in which points are accumulated in the preferred embodiment. In the above example, the amount of the customer's purchase must be at least ten dollars ($10) in order for a customer to earn any regular points. If the purchase price of all items purchased is greater than or equal to ten dollars ($10), the customer will earn five points per dollar amount purchased up to, but not including the second break point at twenty five dollars ($25). Once the total purchase value reaches twenty five dollars ($25), in addition to the five points being earned for each dollar between $10 and $25, the customer earns ten points for each dollar beginning with the twenty fifth dollars ($25).

As shown in table 1, if the purchase amount is equal to five dollars ($5.00), no points are awarded. If the purchase amount is at least equal to ten dollars ($10.00), five points are awarded. No points are awarded for purchases that are less than ten dollars. If the purchase amount equals fifteen dollars and twenty one cents ($15.21), thirty (30) points are awarded: five points are awarded for the first ten dollars ($10) and five points for each dollar above ten dollars ($10) for a total of 30 points. No points are awarded for the twenty one cents because all cent amounts are truncated when calculating points. If the purchase amount is equal to thirty dollars and ninety nine cents ($30.99), one hundred thirty five (135) points are awarded. Five points are awarded for the first ten dollars ($10) and for each dollar above ten dollars ($10) for a total seventy five points. The seventy five points are characterized as first break points. Because the total purchase amount is greater than twenty five dollars ($25), the customer earns second break points which are ten points for the first twenty five dollars ($25) and for each dollar above twenty five dollars ($25) for a total of 60 points. No points are awarded for the ninety nine cents. The total points earned for a purchase that totals thirty dollars and ninety nine cents ($30.99), as shown above in table 1, is one hundred thirty five points (135) by virtue of combining the first and second chance break points.

In the case of a customer account card being presented late during the sales transaction, the system includes the ability to provide credit to the consumer for any bonus items scanned before the card was presented so that they are printed on the receipt and the customer is issued those bonus points. Likewise, the system-also provides the customer with the opportunity to redeem points for any redeemable item input into the system before the card number was entered. The card may be presented at any time in the order prior to the time payment is entered into the POS device.

Customers may redeem the points earned in a number of ways, including gift certificates and/or catalog items at the retailer service desk, or at the point-of-sale device during when purchasing a redeemable item. However, in some embodiments of the system, a customer may not be allowed to redeem points until certain information has been input the system. For example, a retailer may want demographic information input into the customer record of each customer prior to allowing each customer to participate in the program. The retailer could implement this requirement by placing a block on each customer's redemption of points until the demographic information has been input into the customer record.

The redemption of points at the service desk for catalog items, certificates, and certificates for travel related rewards that may be redeemed at a variety of point levels, are validated against the customer account at the centralized host system database, and the customer's point balance in the account is debited on the system real-time upon redemption of points for certificates or catalog items.

The redemption of points during check-out by a customer at the point-of-sale device can be made to only occur for items that are specifically designated as redeemable items. Items are designated as redeemable by the retailer. A customer who purchases an item designated as redeemable will be notified of the item's eligibility for redemption by the retailer. In some embodiments, depending upon capabilities of the POS system, the POS device may notify the cashier and customer of the item's eligibility for redemption as the item is scanned. If the customer decides to redeem the item eligible for redemption, points will be debited from the customer's account point balance and the customer will receive reaction in the price of the item immediately. The system also includes the ability to reflect additional reductions in the price of transaction items that are determined by the individual retailers. For example, all customers that present the account card can be given cents off discounts of any amount for a transaction item identified by the retailer. This additional reduction in price can be given separately or in combination with the price reduction that is provided by the redemption of points on selected items.

An example of the additional reduction in price utilized in combination with a standard point redemption can be visualized on a redeemable item priced at two dollars ($2.00). If the retailer desires to give away the redeemable item at no cost to the consumer, the retailer may assign an additional reduction amount of eighty cents to the redeemable item. When a customer presents the account card along with the purchase of the item, they would get an eighty cent discount and if they choose to redeem the item, they could exchange 750 points for a reduction of $1.20 and get the item for free. In this scenario, the additional discount is not dependent upon whether the customer redeems points for a reduction in price, any customer that participates in the program and presents the account card would get the reduction in price. It is also contemplated that the additional discount could be dependent on redemption of points. Wherein the additional reduction in price of eighty cents will not occur unless the customer elects to redeem points for an initial reduction in price.

During customer check-out at the point-of-sale device, the system prints on the sales receipt bonus item descriptions and the corresponding bonus points earned for all bonus items purchased during the customer's visit to the retailer.

Redemptions taken by the customer at the point-of-sale are also printed on the receipt. When the customer completes all transactions, the system calculates and prints on the customer receipt the total points earned for those transactions and the new account point balance which reflects all points earned and redeemed during the present visit to the retailer. The system also transmits a message carrying the total points earned in the transaction by point category and the total points redeemed in the current transaction to the centralized host system database at the completion of a transaction so that the customer account can be updated. At the retailer's option, the system allows for the retailer to create a transaction log file that is configured to capture and upload information about customer transactions at various levels of detail for data analysis.

Detailed Functional Description

FIG. 1, shows a functional diagram of an embodiment of the computer implemented consumer transaction point accumulation system 2. The system 2 includes an in-store system 10, a retailer host 30 and a program coordinator host system 40. The in-store system 10 is comprised of a general retailer point-of-sale device 12 that includes a magnetic card reader and/or bar code scanner and has on-line connectivity to both the program coordinator host system 40 and the retailer host system 30. The point of sale device 12 is electrically coupled to a controller 14 that is electrically coupled to an in-store system communicator 18. In other embodiments, the system does not include an in-store system communicator and the system controller performs the function of communicating.

The in-store system also includes a networked workstation 16 that is utilized at the retailer service desk. The in-store system communicator 18 and the service desk work station 16 routes the transactions of the in-store system to and from the host system 40 via a communication network. The transactions being routed between the in-store system 10 and the host system 40 occur in real-time.

The system also includes a retailer host system 30 that is electrically coupled to the in-store system controller 14. The retailer host system 30 facilitates centralized setup of program data related to bonus and point-of-sale redeemable items. The retailer host system 30 transmits the set-up details for bonus and point-of-sale redemption items to the point of sale devices at each retailer outlet through the in-store system controller 14. Although the majority of the setup data is received in batch from the retailer host, which may be off-site, it may be necessary for store personnel to correct and/or modify set-up details downloaded from the host. A mechanism to read and change item level point parameters is thus a requirement at retailer level. Such changes are usually performed by accessing the in-store system controller 14 database. The retailer host system 30 also provides the retailer with the ability to batch upload customer data for analysis.

The service desk work station 16 comprises a personal computer running a software application that allows a retailer to access the centralized host system 40. The retailer may access the application controlling the system and perform a number of functions depending on the levels of security attached to the function and the retailer employee's security clearance level. The functions available for access from the service desk work station 16 include: balance inquiry, transfer points, point balance adjustments, point refund, certificate issuance, merchandise order, add/change alternate identification, cancel/reissue customer card, enter enrollment data, and modify enrollment data. The service desk workstation also transmits information regarding new customer enrollment changes to the operational database host system 44.

The balancing inquiry function provides the customer with a current account balance. The transfer points function allows retailer to assist customers in consolidating points between two customer accounts. The point balance adjustments function provides retailer personnel with the ability to make corrections to the customer's point balance in the customer's account. The point refund function provides the retailer with a mechanism to recover points issued on merchandise returns.

The certificate issuance function allows the retailer to issue certificates to the program customers to be used at participating retailers. The certificates are printed with pre-assigned serial numbers in specific dollar amounts. When certificates are physically distributed to retailers the host system 40 logs the serial numbers sent to each store and flags each certificate with a status "D" indicating that the certificate is distributed and eligible for issuance. At the time of issuance, the certificate serial number is entered at the service desk work-station and verified through the on-line point server 42 to determine the status and value of the certificate. In order to be issued, the status flag for the certificate number being issued must be in the "D" state on the on-line point server 42. When the certificate is issued, the customer account is debited by the number of points necessary to purchase the certificate and the status flag for the certificate is changed to "I" on the on-line point server 42 indicating the certificate has been issued. The status flag assists with assuring that the certificates are used only once for their face value.

When a certificate is being returned for redemption in exchange for a reduction in the price of a transaction (for example a $10 certificate for a reduction of $10 off the price of merchandise), the cashier must input the serial number of the certificate into the POS device. Following entry of the serial number, the POS device which is electrically coupled to the on-line point server 42 sends a request to the on-line point server 42 to determine whether the certificate presented is an issued and redeemable/valid certificate. The on-line point server 42 validates the certificate by indicating that the status of the certificate is ("I") issued and outstanding and that the certificate has not been previously redeemed. The retailer may redeem the certificate once an approval message is sent to the POS device by the on-line point server 42. The retailer may then reduce the amount due on a purchase by the face value of the certificate. A certificate that is redeemed has its status in the on-line point server 42 immediately changed to ("R"). The redeemed status takes the certificate out of circulation and prevents the certificate from being used again.

The merchandise order function provides the retailer with the ability to assist the customer in redeeming points for catalog items. When the customer seeks to purchase catalog items, the customer account is verified through the on-line point server to insure that the customer has a sufficient point total in order to redeem a specified catalog item. If the customer account has sufficient points it is debited real-time by the number of points necessary for purchase of the selected catalog item. The add/change alternate identification function allows for substitute identification numbers to be set up and modified. The canceled/reissued customer card function allows a retailer to close an existing customer account and transfer the points and customer information to a new customer account. The enter enrollment data function allows the store to enter demographic information for new program participants into the operational data base host system 44. The modify enrollment data function allows the store to change demographic information for customers.

The in-store system controller 14 communicates directly with the in-store system point-of-sale devices 12 and data files that define the items for sale at the retailer outlet as being bonus, exempt or redeemable. Bonus item, redemption item and exempt item data is transmitted from the retailer host system 30 to data storage files within the in-store system controller 14 for updating the in-store system controller data files relating to bonus, redemption and other system data. The in-store system controller 14 may also perform end-of-the-day processing at the local level which transmits daily totals to the on-line point server 42 for reconciliation. Upon receiving acknowledgment from the on-line point server 42 that the totals record was successfully received, the system controller 10 may extract customer activity and upload customer files to the operational data base host system 44. This function also advances the in-store business date.

The on-line point server 42 serves all on-line request for point inquiries, updates and redemptions for consumer accounts. The on-line point server 42 maintains a customer file that includes a plurality of consumer records for each customer that is a participant of the point accumulation system program. The file within the on-line point server 42 also includes a plurality of merchant records for each of the plurality of non-competing retail merchants that support the program. Each customer record has the customer account data for each participating customer which includes at least data fields for storing the customer account number and the customer's total accumulated point value. The merchant records include but are not limited to transaction activity information.

The on-line point server 42 stores detailed point activity data for a current business day in a transaction log file within the on-line point server 42 database. The on-line point server 42 extracts and transfers all relevant data to the operational database host system 44 for batch updating on a nightly basis. The on-line point server maintains each transaction log file until the operational database server returns a renewal file to the on-line point server at which point the on-line point server executes a renewal process which updates the on-line customer database and purges the corresponding transaction log file.

The operational database host system 44 serves as a master data warehouse to service all non-real-time requirements for data (i.e. helpdesk, accounting, reporting, etc.) in support of the on-line point server 42. In addition, the operational database host system 44 services all requests from the in-store service desk to add and modify customer demographic data. On a nightly basis, the operational database host system 44 receives the transaction log file extract file from the on-line point server 42, updates the appropriate tables on the operational database and creates a renewal file. The renewal file is transferred to the on-line point server 42 to facilitate synchronization of the two-customer databases within the host system 40. The system includes the capability to perform a full file audit to make sure that the two-customer databases are in sync.

The retailer host system 30 is where a majority of the setup data regarding bonus, redeemable and exempt items is entered for transmission to the in-store system controller 14 at each retailer outlet. The retailer host system performs at least the following functions: exempt setup, bonus item setup, in-store redemption item setup, and daily settlement processing. The retailer host system 30 also receives the transactional log files from the in-store system controller 14 and service desk 16. The exempt setup function defines the items and departments where the program points cannot be awarded. This information is to be downloaded to the in-store system controller 14 database for use in the retailer outlet. Although it is not a requirement, in this particular embodiment, the bonus item setup assigns a positive point value to an item and may also assign a start/stop date that defines the period during which an item maintains bonus status. Bonus item setup function also identifies the sponsor of the bonus points—the store, the program coordinator, or a manufacturer. This information is also downloaded to the in-store system controller 14 database for use at each individual retailer outlets. The redemption item setup function assigns a negative point and dollar value to an item and a start/stop date that defines the period during which an item maintains redemption status. In this particular embodiment, the point value for redeeming a redemption item is −750 points. The reduction of the price of the redeemable item is −$1.20, assuming the item purchased has a price that is greater than or equal to $1.20. This information is to be downloaded into the in-store system controller 14 at the individual retailer outlets. The retailer host system 30 also performs end-of-day processing which extracts all customer activity from each store by retrieving the transaction log files from each in-store system controller 14 and service desk 16 at each retailer location. These files of daily activity are uploaded to the retailer's host 30 and/or to operational database host system 44. The retailer host system 30 also provides for batch communications of collected data to the host system 40.

Processing of the transactions that occur may be performed in two modes, one-phased or two-phased. A one-phased transaction is one in which the in-store system communicates once with the host system during the customer's transactions. The one communication is the request and authorization for a point update transaction where the opportunity for point redemption is not selection. A two-phased transaction is where there is an automatic balance inquiry at the beginning of the transaction and a point update at the end of the transaction.

Figure 2A:
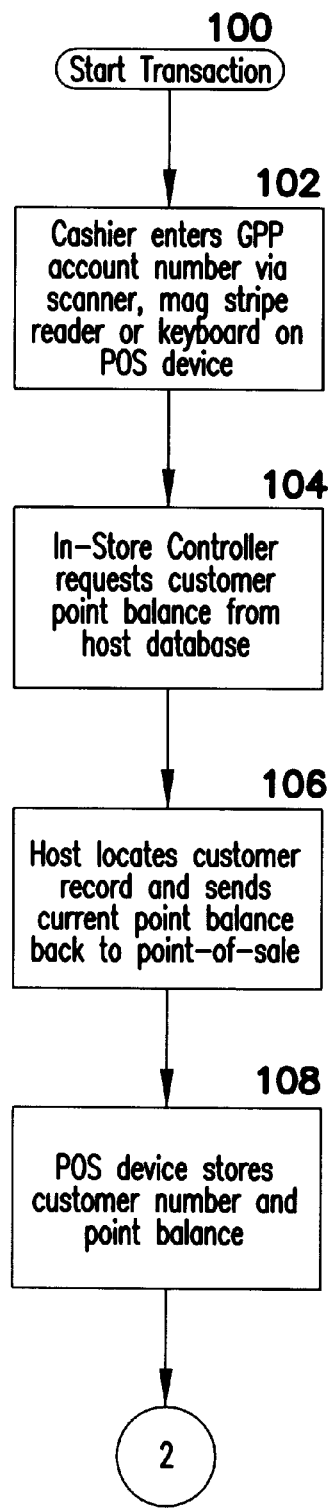
FIG. 2a, 2b and 2c are flow charts depicting the logical flow of an in-store points redemption system in accordance with the principles of the invention.
Figure 2B:
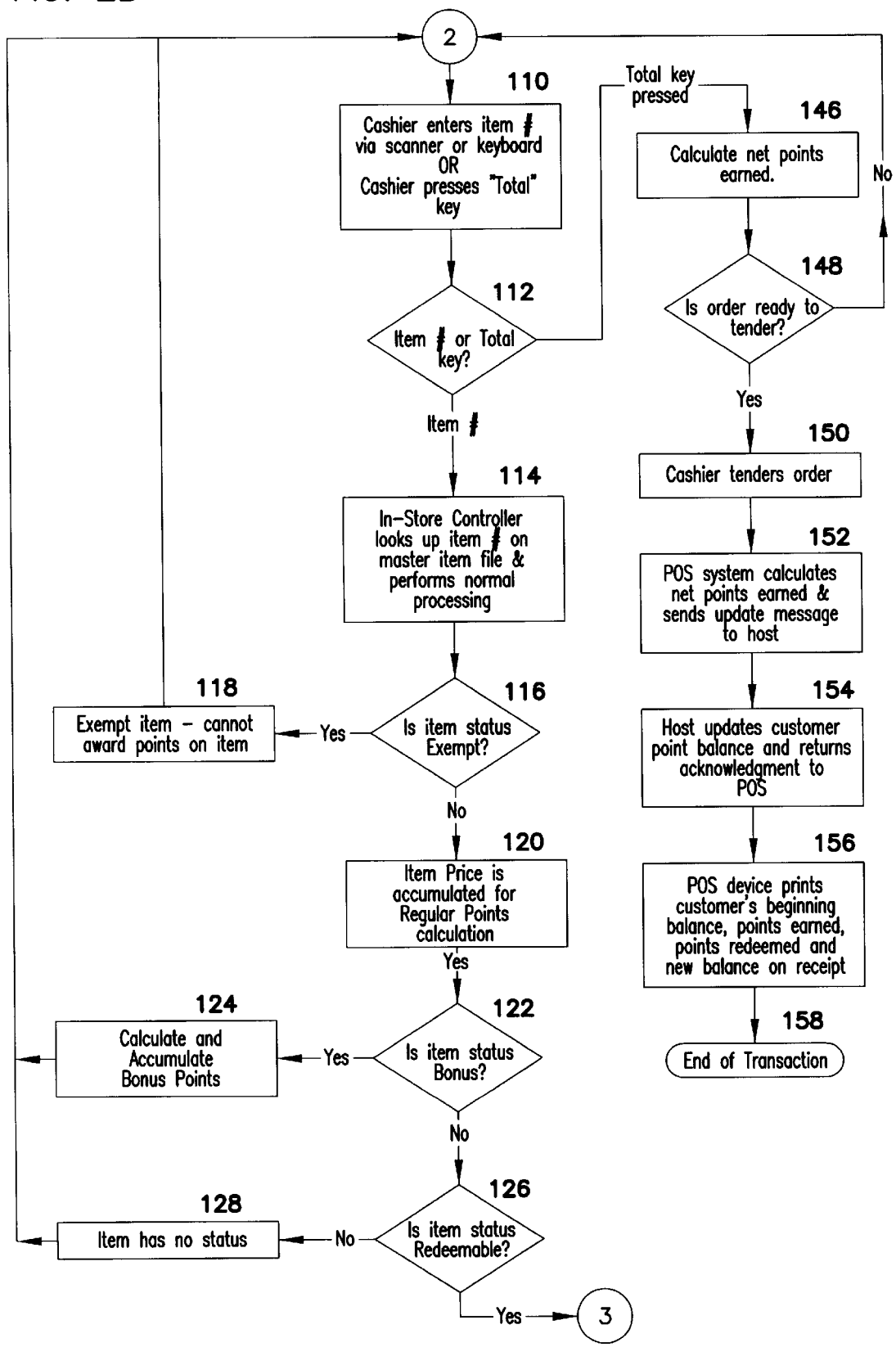
Figure 2C:
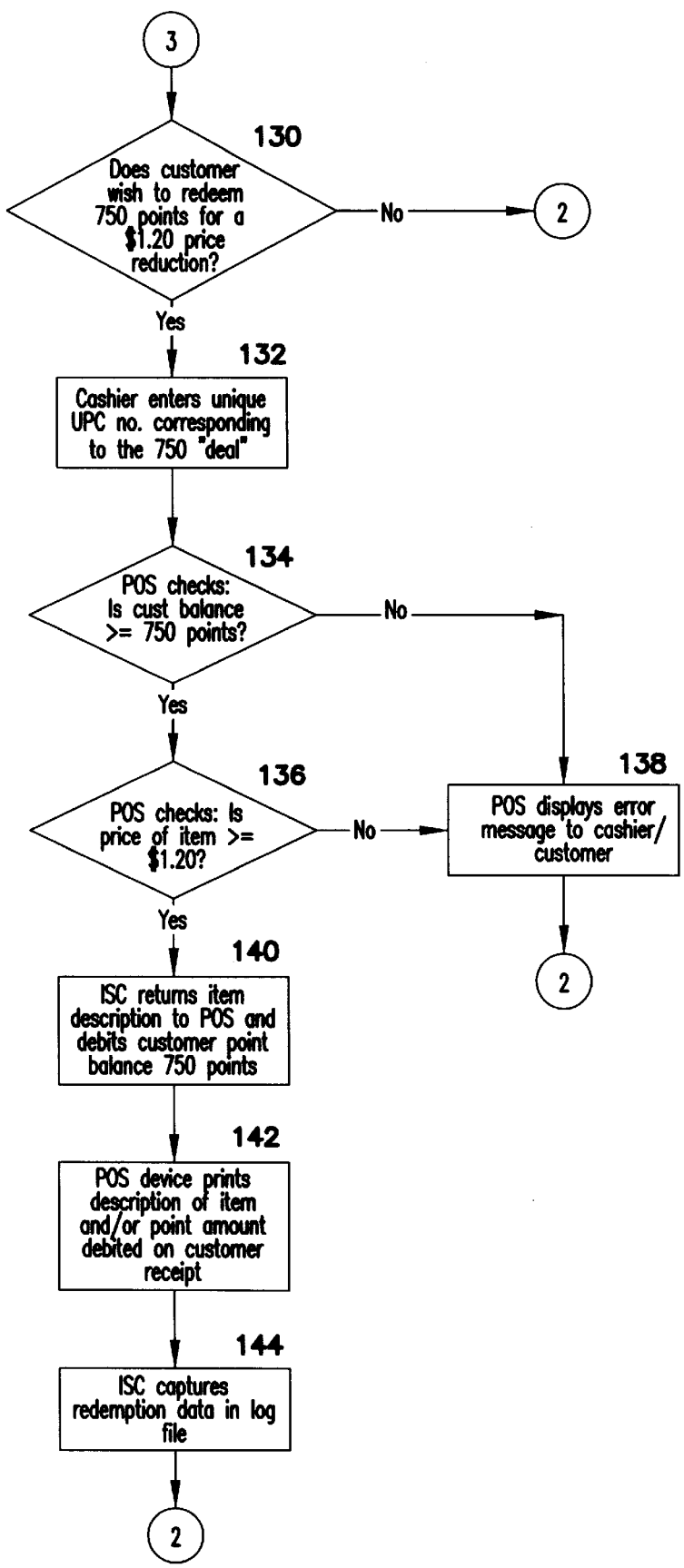

Referring now to FIG. 2, there is shown an overview of an embodiment of the consumer transaction point accumulation system main processing in the two phased mode. The point accumulation system's processing begins when a customer at the point-of-sale device for a retailer begins to purchase retailer products or services. At the start of the transaction 100, the retailer outlet cashier enters the customer's account number into the in-store system's point-of-sale device by way of a magnetic stripe card reader, keyboard or any other data input device used in conjunction with the point-of-sale device 102. Following input of the customer's account number, the in-store system controller 14 requests the customer's current point balance 104 from the host system 40 database 104. The host system 40 processes the request and locates a customer's account record stored within the host system 40 database and sends the account record back to the point-of-sale device 106 through the in-store system controller 14. The customer record that is sent back to the point-of-sale device 12 includes at least the customer's current accumulated point balance. The request for data by the in-store system 10 from the host system 40 and the transmission of customer account data from the host system 40 to the in-store system 10 both occur real-time so that the point-of-sale device 12 may save the customer's current accumulated point balance and account number in temporary data storage within the point-of-sale device 12 pending entry of a redeemable item 108. The customer point balance is also temporarily stored in the controller 14 so that points accumulated throughout the customer's transaction may be updated more quickly by updating the point balance being temporarily stored in the controller 14.

Following the capture of the customer's account record, the cashier enters an item number for an item being purchased by the customer via a scanner or keypad 110, 112 causing the point-of-sale device 12 to communicate with the system controller 14 requesting the controller 14 to look up the item number of the item being purchased on a master item file within the in-store system controller 14 database 114. All items of possible purchase should be stored in the master item file where they are cross referenced with an item number and a status label. The status label for each item stored within the in-store system database is either exempt, redeemable, bonus or no status. First, the system checks to see if the item the customer seeks to purchase has exempt status 116. If the status is exempt, no points can be awarded for the purchase of that particular item 118. The system then returns the point-of-sale device process back to the item entry state 110 so that the retailer may enter the item number of the next item desired to be purchased the item the customer seeks to purchase is not referenced as exempt, the point-of-sale device adds the price of the item to the accumulator tracking the eligible total for calculation of "regular" points 120. Next, the system checks to see if the item the customer seeks to purchase has bonus status 122. If the item being purchased has bonus status 124, the system processes the item being purchased as a bonus item and adds bonus points to the customer accumulated point balance total stored in temporary storage of the point of sale device. Next, the system returns the point-of-sale device process back to the item entry state 110 so that the retailer may enter the item number of the next item desired to be purchased.

If the item being purchased by a consumer does not have bonus status, the system checks to see if the item has redeemable status 126. If the item does not have redeemable status, it has no status 128 and the system returns the point-of-sale device process back to the item entry state 110 so that the retailer may enter the item number of the next item desired to be purchased. If the item has redeemable status, the system may notify the retailer of such status and prompt the cashier to ask the customer if he/she wishes to exchange points for a reduction in the price of the item purchased 130. In this embodiment, the customer may exchange 750 points for a $1.20 reduction in the price of the redeemable item being purchased. If the consumer declines to exchange points for $1.20 off the price of the redeemable item being purchased, the system returns the point-of-sale device process back to the item entry state 110 so that the retailer may enter the item number of the next item desired to be purchased. If the customer desires to exchange 750 points for a $1.20 reduction in the price of the item purchased 132, the cashier enters a unique code into the point-of-sale device corresponding to acceptance by the customer of the point exchange for a reduction in purchase price option. Following acceptance of the point exchange option by the customer, the point of sale device checks the balance of the customer's point total being temporarily stored in the point-of-sale device temporary data storage 134. Specifically, in this particular invention, the system is checking to see if the customer account point total is greater than or equal to 750 points. If the point total is less than 750 points 134, the point of sale device displays an error message to the retailer and voids out the 750 point exchange option 138 and the system returns the point-of-sale device process back to the item entry state 110 so that the retailer may enter the item number of the next item desired to be purchased. If the customer account point balance is greater than or equal to 750 points, the point-of-sale device checks the in-store system controller data base to determine if the price of the item being purchased is greater than or equal to $1.20 136. If the price of the item being purchased is less than $1.20, an error is displayed at the point-of-sale device to the retailer and the system returns the point-of-sale device process back to the item entry state 110 so that the clerk may enter the item number of the next item desired to be purchased 138. If the price of the item being purchased is greater than or equal to $1.20 140, the in-store system controller returns an item description to the point-of-sale device and debits the customer accumulated point balance temporarily stored in the point-of-sale device temporary storage by 750 points 140. The point-of-sale device prints a description of the item redeemed and/or the point amount debited from the consumer's accumulated account balance on the customer receipt 142. The in-store system controller also captures redemption and bonus data in a log file 144. Then, the system returns the point-of-sale device process back to the item entry state 110 so that the clerk may enter the item number of the next item desired to be purchased.

If all customer transaction items have been purchased, the retailer may press a total key 110, 112 in order to indicate that the customer's transaction is complete. Once the customer's transactions have been completed, the controller calculates the net points earned by the customer during the current sales visit 146. Next, the retailer determines whether the order is ready to tender 148. If the order is not ready to tender, the system allows for the return of the point-of-sale device process to the item entry state 110 so that the retailer may enter data necessary to tender the order. If the order is ready to tender, the retailer tenders the order 150 and the point-of-sale device calculates the total net points earned during the current sale's visit and the new account balance of points accumulated 152. The point of sale device also sends an update message to the host that includes the customer's points earned in the current transaction 152. The system host retrieves the point update transaction and returns an acknowledgment of receipt of the update message to the in-store system controller and point-of-sale device 154. In either the ore-phased or two-phased mode, following receipt of a point update response message from the host system the point-of-sale device prints a receipt for the customer that includes the beginning point balance, the total points earned during the sales visit, the total points exchanged for price reductions during the sales visit and the new account point balance 156, which completes the transaction for that customer 158.

Although the operation of an embodiment of the computer implemented consumer transaction point accumulation system has been disclosed, alternative embodiments of the invention can be made without the departing from the spirit and scope of the invention. It should be appreciated and understood that the invention resides in the claims hereinafter appended.

What is claimed:

1. A computer implemented real-time consumer transaction point accumulation system in which a consumer earns and accumulates points immediately in centralized data storage for transactions at any one of a plurality of participating retailer outlets networked to a host incentive award system, the system comprising:

(a) at least one participating retailer outlet system including:
  (i) a local processor;
  (ii) local data storage electrically coupled to said local processor,
  (iii) data input means electrically coupled to said local processor for receiving consumer account identity data and consumer account requests; and
  (iv) a local communicator electrically coupled to said local processor for transmitting requests for consumer account data;
(b) a host incentive award system having at least:
  (i) a host processor;
  (ii) the centralized data storage electrically coupled to said host processor, the centralized data storage including a plurality of consumer records, wherein each consumer record includes at least a consumer point balance;
  (iii) a host communicator electrically coupled to said host processor for receiving requests for said consumer account data, said host communicator transmitting at least said point balance to said participating retailer outlet system;
(c) wherein said participating retailer outlet system processes each consumer transaction during the consumer visit to the participating retailer outlet to determine points earned and causes said point balance in the centralized data storage to be immediately updated by adding said points earned to said point balance in the centralized data storage.

2. The computer implemented system of claim 1 wherein the local processor determines points earned based on the dollar amount of the current sales transaction.

3. The computer implemented system of claim 1 wherein the local processor determines points earned based on the dollar amount of the current sales transaction less the dollar amount for any exempt items purchased.

4. A Computer implemented method of immediate consumer point accumulation in a centralized database resulting from consumer transactions at any one of a plurality of participating retailer outlets networked to a host incentive award system, the method comprising the steps of:
  inputting consumer identity data into a local system;
  requesting consumer transaction point data stored within a host system database, said consumer transaction point data representing an initial transaction point total previously earned by a consumer,
  storing said consumer transaction point data in temporary data storage;
  awarding points based on the dollar amount of the current sales transaction;
  immediately updating said consumer transaction point data stored in said temporary data storage by performing the step of adding said points awarded during the current sales transaction to said initial transaction point total;
  immediately updating said consumer transaction point data stored within said host system database to reflect the addition of the points awarded to said initial point total.

5. The method of claim 4 further including the step of awarding points based on the dollar amount of the current sales transaction for transaction items identified as having a select status.

6. The method of claim 4 further including the step of awarding points based on the dollar amount of the current sales transaction less the dollar amount for any exempt items purchased.

7. The method of claim 4 further including the steps of:
  analyzing said updated consumer transaction point data to determine if said updated consumer transaction point balance is greater than or equal to a cash credit point balance; and
  where said updated consumer transaction point balance is greater than or equal to said cash credit point balance, providing a consumer with an option to immediately reduce the price of one of said transaction items having said select status by a specified amount.

8. A computer implemented real time consumer transaction point accumulation system in which a consumer earns and accumulates points immediately in centralized data storage for each individual purchase of select items purchased during a consumer transaction at any of a plurality of participating retailer outlets networked to a host incentive award system, the system comprising:
  (a) at least one in-store system including:
    (i) a local processor;
    (ii) local data storage electrically coupled to said local processor,
    (iii) data input means electrically coupled to said local processor for receiving consumer account identity data and consumer account requests; and
    (iv) a local communicator electrically coupled to said local processor for transmitting requests for consumer account data;
  (b) a host system having at least:
    (i) a host processor;
    (ii) a host database electrically coupled to said host processor, said host database including a plurality of consumer records, wherein each consumer record includes at least a consumer point balance;
    (iii) a host communicator electrically coupled to said host processor for receiving requests for said consumer account data, said host communicator transmitting at least said point balance to said in-store system;
  (c) said in-store system performing the following steps:
    (i) processing each individual purchase of an item during the consumer transaction at the participating retailer outlet to determine points earned on select items;
    (ii) real time updating of said point balance in said in-store system by adding said points earned on said select items to said point balance;
    (iii) immediately transmitting said updated point balance to said host database upon completion of the consumer transaction.

9. The computer implemented system of claim 8 wherein the local processor determines points earned based on the dollar amount of the current sales transaction for select items purchased.

10. The computer implemented system of claim 9 wherein some of the select items are bonus items, wherein additional points are earned for the purchase of select items that are bonus items.

11. A computer implemented real time consumer transaction point accumulation system in which a consumer may immediately redeem points earned on an item being purchased for a reduction of the price of the item being purchased, the system comprising:
  (a) at least one in-store system including:
    (i) a local processor;
    (ii) local data storage electrically coupled to said local processor, (iii) data input means electrically coupled to said local processor for receiving consumer account identity data and consumer account requests; and (iv) a local communicator electrically coupled to said local processor for transmitting requests for consumer account data;

(b) a host system having at least:

(i) a host processor;

(ii) a host database electrically coupled to said host processor, said host database including a plurality of consumer records, wherein each consumer record includes at least a consumer point balance;

(iii) a host communicator electrically coupled to said host processor for receiving requests for said consumer account data, said host communicator transmitting at least said point balance to said in-store system;

(c) said in-store system performing the following steps:

(i) analyzing said point balance to determine if said point balance is greater than or equal to a cash credit point balance; and (ii) where said point balance is greater than or equal to said cash credit point balance, providing the consumer with an option to immediately reduce the price of one of a select item being purchased by a specified amount.

12. The computer implemented system of claim 11 wherein said in-store system further performs the following steps:

(i) updating said point balance in said in-store system by adding said points earned to said point balance;

(ii) analyzing said updated point balance to determine if said updated point balance is greater than or equal to a cash credit point balance; and (iii) where said updated point balance is greater than or equal to said cash credit point balance, providing the consumer with an option to immediately reduce the price of one of a select item being purchased by a specified amount.

\* \* \* \* \*